L. A. YOUNG.
DEVICE FOR REMOVING CREAM FROM MILK BOTTLES.
APPLICATION FILED DEC. 26, 1908.
962,187.
Patented June 21, 1910.
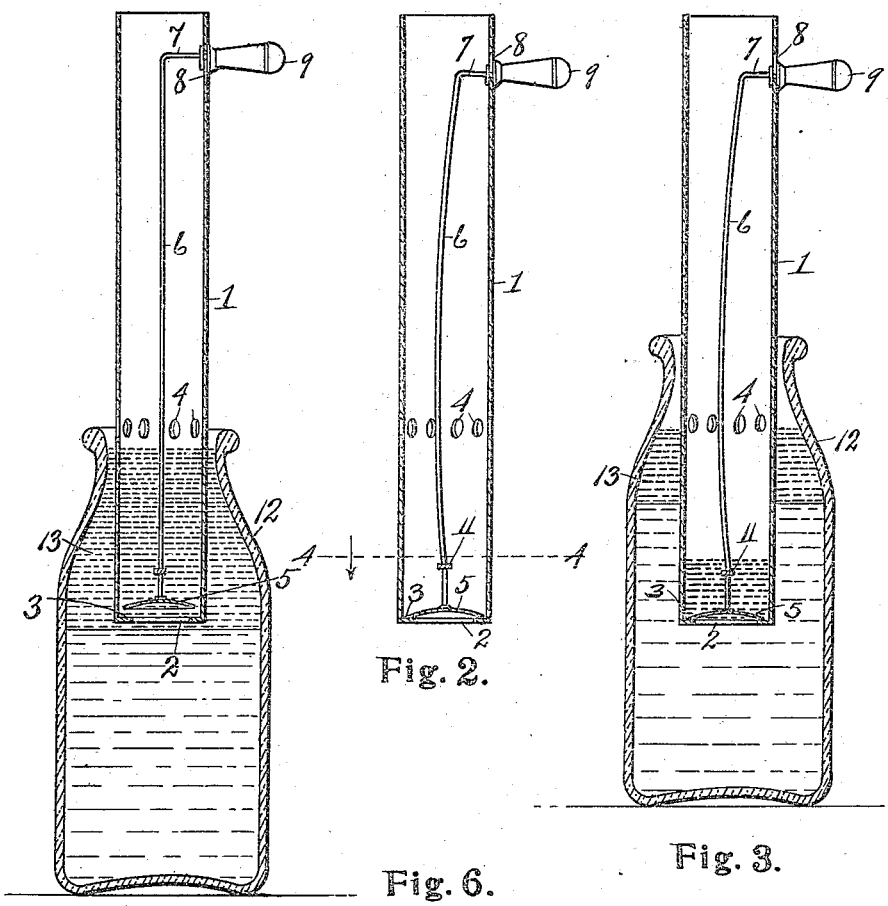
Fig. 1.  Fig. 2.  Fig. 6.  Fig. 3.
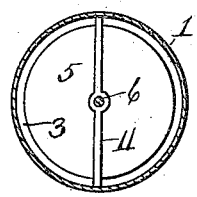
Fig. 4.
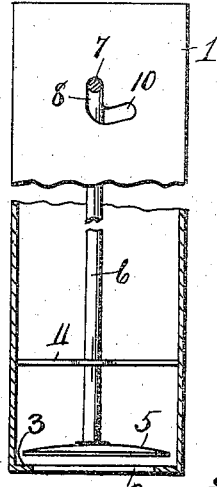
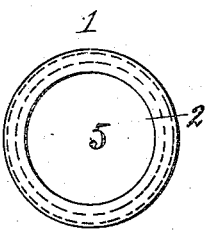
Fig. 5.
Witnesses
O. B. Baenziger.
J. G. Howlett.
Inventor
Leonard A. Young.
By
T. A. Wheeler & Co.
Attorneys

UNITED STATES PATENT OFFICE.

LEONARD A. YOUNG, OF DETROIT, MICHIGAN.

DEVICE FOR REMOVING CREAM FROM MILK-BOTTLES.

962,187.   Specification of Letters Patent.   Patented June 21, 1910.

Application filed December 26, 1908. Serial No. 469,471.

*To all whom it may concern:*

Be it known that I, LEONARD A. YOUNG, a citizen of the United States, residing at Detroit, in the county of Wayne, State of Michigan, have invented certain new and useful Improvements in Devices for Removing Cream from Milk-Bottles; and I do declare the following to be a full, clear, and exact description of the invention, such as will enable others skilled in the art to which it appertains to make and use the same, reference being had to the accompanying drawings, and to the figures of reference marked thereon, which form a part of this specification.

This invention relates to a device for withdrawing or removing the cream from the top of milk in milk bottles, and consists in the construction and arrangement of parts hereinafter more fully set forth and pointed out particularly in the claim.

The object of the invention is to provide a simple and efficient device whereby the cream which forms at the top of the milk in milk bottles, may be readily and entirely removed without withdrawing any of the milk therewith, the arrangement being such that the cream which is of lighter specfic gravity than milk, may be taken from the bottle without the operation of pouring said contents therefrom.

The above object is attained by the device illustrated in the accompanying drawing, in which:—

Figure 1 is a central vertical section through a bottle of milk and my cream removing device, showing the initial operation in removing the cream. Fig. 2 is a central vertical section through the cream remover. Fig. 3 is a central vertical section similar to Fig. 1, showing the second operation in removing the cream from the top of the milk in the bottle. Fig. 4 is an enlarged cross section through the cream removing device, as on line 4—4 of Fig. 2. Fig. 5 is a plan of the bottom of the cream removing device. Fig. 6 is an enlarged fragmentary view partly in section, showing the construction of the cream removing device.

Referring to the characters of reference, 1 designates a cylindrical tube of the requisite diameter formed of suitable sheet metal having a central opening 2 in the bottom thereof and an annular valve seat 3 between the margin of said opening and the wall of said tube. At the requisite distance above the bottom of the tube, the wall thereof is pierced with a plurality of apertures 4 in circumferential alinement. At the bottom of said tube and adapted to seat over the opening 2 is a disk valve 5 fastened to the lower end of a valve rod 6. The upper end of said valve rod is provided with a right angle portion 7 which passes through a vertical slot 8 in the wall of the tube, the outer end of said portion 7 of said valve rod carrying the operative handle 9. Communicating with the lower end of the vertical slot 8 is a laterally extending slot 10 (see Fig. 6) into which the horizontal portion 7 of the valve rod may be passed when said rod is moved downward to seat the valve 5, thereby locking said valve upon its seat.

Crossing the interior of the tube 1 near its lower end is a bar 11 wherein is formed a central aperture through which passes the valve rod 6, whereby said rod is guided and the valve is retained properly in place. The valve rod is somewhat flexible so that when the valve is forced onto its seat and the outwardly projecting portion 7 of the valve rod is locked in the lateral slot 10, said valve rod will be somewhat sprung, as shown in Figs. 2 and 3, whereby the valve is forced onto its seat with sufficient spring tension to make a tight closure.

In describing the operation of this device, reference will be had first to Fig. 1 in which view is shown an ordinary milk bottle 12 having upon the top of the milk therein the usually formed stratum of cream 13. To remove said cream, the valve is raised from its seat by lifting the valve rod 6 and the tube 1 is introduced into the mouth of the bottle so that the cream displaced by the entrance of the tube will flow thereinto through the opening 2 as said tube is slowly passed downwardly. When the tube shall have been filled with cream nearly to the level of the apertures 4, or when the bottom of the tube shall have nearly reached the top of the milk, the valve is closed and the tube withdrawn, when the cream may be discharged from the tube by opening the valve 5. This initial operation, as will be seen, does not remove all of the cream for the reason that a tube that will admit of being entered in the mouth of the bottle is not large enough in diameter to hold the whole quantity of cream which forms upon the top of the milk. A second operation is therefore necessary to remove the remaining cream, which second operation consists in again introducing the tube into the bottle with the valve closed and forcing said tube downwardly therein until the displacement of the contents of the bottle by the entrance of the tube shall have raised the cream to the level of the apertures 4, as shown in Fig. 3, when the cream will run into the tube through said apertures as the tube is depressed, thereby enabling all of the cream to be drawn off from the top of the milk, the cream remaining in the tube after the second operation, being discharged therefrom by lifting the valve.

It will now be apparent that by means of this device, the cream which forms at the top of the milk in a milk bottle may be readily removed without removing any of the milk therewith and without materially disturbing the milk in the bottle.

Having thus fully set forth my invention, what I claim as new and desire to secure by Letters Patent, is:—

A device for removing cream from the top of milk bottles, comprising a displacement tube adapted to be introduced into the mouth of the bottle to displace the contents therein, said tube having an opening in the bottom thereof, a flat valve seat surrounding said opening, a disk valve adapted to engage said seat to close said opening, a spring valve rod attached to said valve, the wall of the tube at its upper end having a vertical slot therein, and a lateral slot extending from the bottom of said vertical slot, the upper end of said valve rod having a right angled portion extending through and normally lying in said vertical slot and movable into said lateral slot, and a handle upon the portion of the valve rod extending through the slot in said tube for lifting the valve rod vertically and for moving it into said lateral slot.

In testimony whereof, I sign this specification in the presence of two witnesses.

LEONARD A. YOUNG.

Witnesses:
O. B. BAENZIGER,
I. G. HOWLETT.